United States Patent [19]

Snow

[11] 3,955,594

[45] May 11, 1976

[54] PRESSURE OPERATED VALVE SYSTEMS

[75] Inventor: Richard K. Snow, Houston, Tex.

[73] Assignee: Raymond International Inc., Houston, Tex.

[22] Filed: Feb. 25, 1974

[21] Appl. No.: 445,356

[52] U.S. Cl............ 137/493; 137/525; 137/565; 251/4; 138/45
[51] Int. Cl.² .................... F16K 15/14
[58] Field of Search............ 137/525, 493, 493.9, 137/525.1, 565; 251/4, 5; 138/45

[56] References Cited
UNITED STATES PATENTS

| | | | |
|---|---|---|---|
| 2,518,625 | 8/1950 | Langstaff | 251/5 X |
| 2,572,658 | 10/1951 | Perkins | 251/5 X |
| 2,750,959 | 8/1956 | Von Seggern | 251/5 X |
| 2,760,436 | 8/1956 | Von Seggern | 137/525 X |
| 2,994,336 | 8/1961 | Bryan | 251/5 X |
| 3,288,371 | 11/1961 | Broughton | 137/525 X |
| 3,342,216 | 9/1967 | Griffin | 138/45 |
| 3,353,560 | 11/1967 | McCulloch | 137/525 X |
| 3,396,448 | 8/1968 | Kisling | 251/5 X |
| 3,397,860 | 8/1968 | Bushmeyel | 251/5 X |
| 3,441,245 | 4/1969 | Holland et al. | 251/5 |
| 3,465,967 | 9/1969 | Card | 251/5 X |
| 3,479,001 | 11/1969 | Dowel | 251/148 X |
| 3,485,472 | 12/1969 | Bozich | 251/5 |
| 3,490,732 | 1/1970 | LeRoy | 251/5 |
| 3,685,786 | 8/1972 | Woodson | 251/4 |
| 3,710,942 | 1/1973 | Rosenberg | 137/525.1 |
| 3,759,289 | 9/1973 | DeWall | 251/5 X |

Primary Examiner—William R. Cline
Attorney, Agent, or Firm—Fitzpatrick, Cella, Harper & Scinto

[57] ABSTRACT

Fluid flow through a conduit is controlled by varying the pressure of the fluid. The fluid passes through a normally closed valve comprising a flexible sleeve held in pinched closed condition by an elastic material which is isolated from all pressures except those transmitted through the sleeve.

10 Claims, 7 Drawing Figures

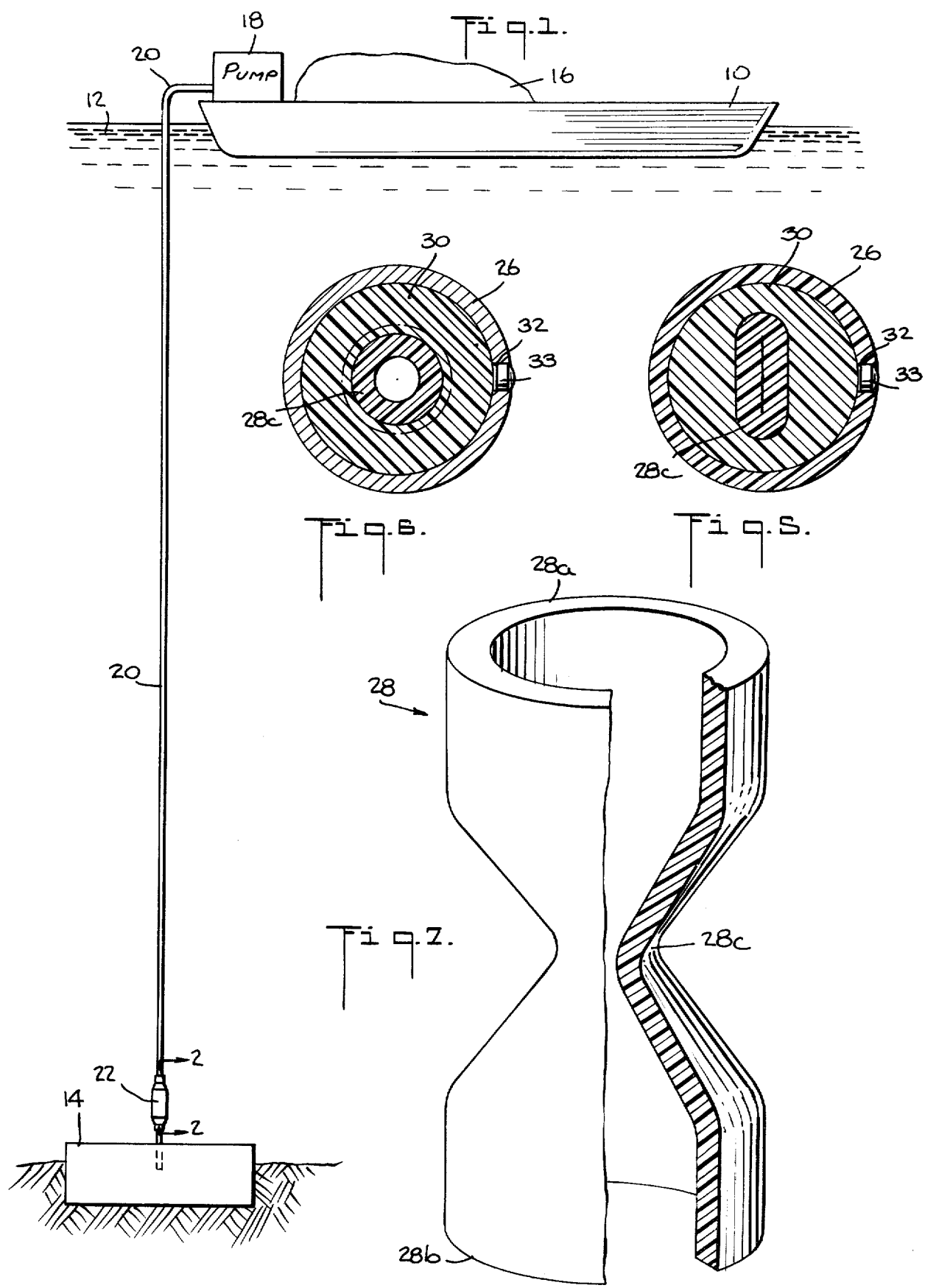

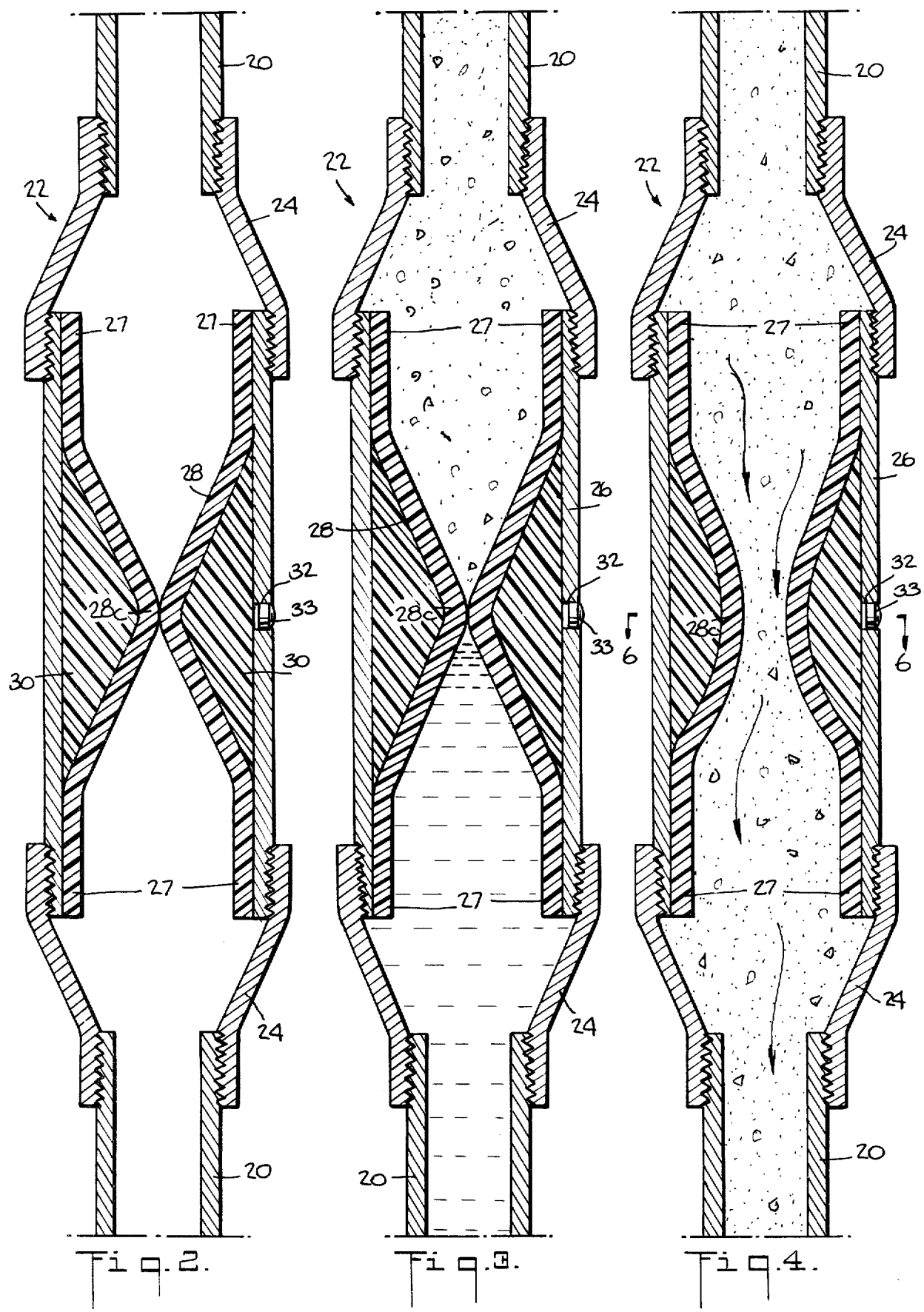

PRESSURE OPERATED VALVE SYSTEMS

This invention relates to fluid control arrangements and more particularly it concerns novel valve systems for controlling fluid flows in response to the pressure of the fluid itself.

The present invention is particularly suitable for underwater construction operations wherein it is often necessary to deposit a liquid or semi-liquid material, such as wet concrete, at a remote location, such as into a form located a substantial distance underwater. In situations of this type, the concrete or other material to be deposited is pumped from a supply area and through a conduit to the remote location where it is deposited out through the end of the conduit and into a form.

Difficulties arise in controlling the flow of the wet concrete. If the flow is controlled locally, i.e. by a valve near the pump, the concrete remaining in the line after the valve is closed may be wasted; and where the conduit is under water, the concrete mix remaining in the conduit may be contaminated or diluted by the water. On the other hand, when the flow is controlled by valves located at the far end of the conduit, complicated and unduly large devices have been required to operate the remotely located valve. Although a simple pressure responsive plug on the remote end of the conduit would permit flow control for a single operation, the flow could not thereafter be shut off.

The present invention overcomes these difficulties of the prior art and permits the remote control of fluid flow along a conduit by means of local control of the fluid pressure. With the present invention, moreover, this is carried out in an accurate and repeatable manner and without complicated control elements extending along the length of the conduit.

According to the present invention a flexible sleeve is provided along a conduit. An elastic material surrounds the sleeve and holds its control region in a normally pinched closed condition. Means are also provided to isolate the elastic material from all pressure effects other than those transmitted through the flexible sleeve. The elastic material is prestressed to hold the sleeve closed against the fluid pressure inside the conduit up to a certain threshold level. When that level is exceeded, the fluid itself forces the sleeve open and passes out from the valve. Thus, the concrete or other material to be deposited at a remote location, remains inside the conduit at a pressure below the threshold level of the valve until the remote end of the conduit has been positioned at a desired location. The pressure within the conduit is then raised, by increasing the pumping pressure, until it exceeds the threshold level of the valve, whereupon the valve opens and the concrete or other material is deposited out through it. The valve automatically closes when the pumping pressure is reduced and the conduit may then be moved to a new location without loss of any material.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the purposes of this invention. It is important, therefore, that this disclosure be regarded as including such equivalent constructions as do not depart from the spirit and scope of the invention.

A single embodiment of the invention has been chosen for purposes of illustration and description, and is shown in the accompanying drawings forming a part of the specification, wherein:

FIG. 1 is a diagrammatic elevational view illustrating a novel concrete depositing system in which the present invention is embodied;

FIG. 2 is an enlarged sectional view taken along line 2—2 of FIG. 1, and showing a pressure responsive fluid control valve according to the present invention;

FIG. 3 is a view similar to FIG. 2 but showing the valve in its normal closed condition;

FIG. 4 is a view similar to FIG. 3 but showing the valve partially opened in response to increased pressure of the material flowing through it;

FIG. 5 is a cross sectional view taken along line 5—5 of FIG. 3;

FIG. 6 is a cross sectional view taken along line 6—6 of FIG. 4; and

FIG. 7 is a perspective view, partially cut away, of a flexible sleeve used in the valve of FIGS. 2–6.

As shown in FIG. 1, a construction barge 10 floats on the surface of a body of water 12 above a previously constructed form 14 located at the bottom of the body of water. The barge contains a supply of wet concrete 16 and a delivery pump 18 which is supplied with the wet concrete. The pump outlet is connected to a supply conduit 20 which extends down over the side of the barge 10 and down through the body of water 12 to the form 14. A pressure responsive flow control valve 22 is interposed along the conduit 20 near the end remote from the pump 18. The valve outlet, as shown, is directed into the form 14.

In use, the barge 10 is positioned so that the outlet of the conduit 20 is brought to a location for proper deposition of concrete into the form 14. During this time the portion of the conduit 20 between the pump 18 and the valve 22 is filled with wet concrete. The valve however is constructed to remain closed against the static head of the concrete in the conduit 20, plus any additional head which may be imposed by the pump 18. When the remote end of the conduit has been brought to its desired location, the pump is driven to raise the pressure in the lower end of the conduit 20 up above the threshold level of the valve 22. This opens the valve and allows concrete to flow immediately into the form 14. When a desired amount of concrete has been deposited, the pump delivery is terminated and the concrete pressure at the lower end of the conduit is reduced to a level below the threshold level of the valve 22, whereupon the valve closes and the flow of concrete is automatically shut off. The barge and conduit may then be moved to a new location and the process repeated.

The internal construction of the pressure responsive valve 22 can be seen in the section view of FIG. 2. As there shown, the valve 22 is interposed along the length of the conduit 20. The valve 22 is made up of a pair of conical or outwardly tapering fittings 24, connected at their smaller ends respectively, to the adjacent portions of the conduit 20. A large diameter pipe section 26 is interconnected between the larger ends of the fittings 24. A flexible elastic sleeve 28, of rubber or similar material extends along the interior of the pipe section 26 and is bonded at its ends, as indicated at 27, to the corresponding ends of the pipe section. The normal unstressed configuration of the sleeve 28, as shown in FIG. 7., resembles that of an hourglass. The larger diameter ends of the sleeve, 28a and 28b, are of the same diameter as the interior of the pipe section 26 (FIG.2), while the central portion of the sleeve 28c as shown in FIG. 7, constricts to a normal unstressed diameter approximately one half the diameter of the interior of the conduit 20.

As shown in FIG. 2, the annular region between the interior of the pipe section 26 and the exterior of the sleeve 28, is filled with an elastic material 30. This material may be a compressible solid or foam elastomer, which has been injected, in liquid form, in through an injection opening 32 in the side of the pipe section 26, and thereafter allowed to cure. It may also be a highly compressed gaseous material provided that adequate seals are maintained. The injection opening 32 is thereafter permanently closed by means of a plug 33.

The elastic material 30 is injected at a pressure such that, after curing, it maintains the flexible sleeve 28 in a pinched closed position in its central region 28c, as shown in FIGS. 2 and 5. The pressure and resiliency of the elastic material 30, moreover, is such that the sleeve 28 will not open until its interior is subjected to a fluid pressure above a predetermined threshold.

FIG. 3 shows the interior of the closed valve 22 when subjected to fluid pressure above the predetermined threshold. As can be seen in FIG. 3 wet concrete 16 from the pump 18 fills the interior of the conduit 20 above the valve 22. This concrete, which at the valve has a static head pressure plus additional pressure from the pump 18, pushes outwardly on the flexible sleeve 28 against the resiliency of the elastic material 30. At the same time water pressure is exerted on the lower portion of the flexible sleeve 28. Both pressures tend to open the valve; however as stated above, the threshold conditions are chosen such that the valve will resist these pressures and remain closed.

It should be noted that the valve does not operate as a conventional check valve. That is, the force holding the valve closed is not a function of the pressure differential between its input and its output. The opening and closing of the present valve instead is a function solely of the pressure of one or of the other of the fluids in the conduit 20 in relation to the opposing pressure of the elastic material 30. Thus neither the sum nor the difference between the fluid pressure at the input and output of the valve has any effect on valve operation up to threshold pressure. As shown in FIG. 5, when the valve is closed, the central portion 28c of the flexible sleeve is flattened. In this condition the sleeve 28 is under compressive stress while the elastic material 30, although also under compressive stress is in its most relaxed condition.

When the fluid pressure within the conduit 20 exceeds the threshold pressure of the valve, for example, when the pump is driven to produce increased line pressure, this increased pressure acts through the sleeve 28 to compress the elastic material 30 and thereby allow the flexible sleeve 28 to open to an unstressed condition as shown in FIG. 6. This allows the concrete 16 or other material to be forced through the valve so long as its pressure is maintained above the threshold pressure. The valve may be further opened to the same diameter as the conduit 20 to permit maximum fluid flow by still further increasing line pressure.

This will cause the central portion 28c, of the sleeve to assume the configuration shown in dotted outline in FIG. 6. In this condition of maximum opening the sleeve is subjected to high tensile forces while the elastic material 30 is subjected to maximum compressive forces.

When the fluid pressure in the conduit is thereafter reduced below threshold, the elastic material 30 overcomes the fluid pressure and pushes the sleeve back to its pinched closed condition as shown in FIGS. 3 and 5. The valve is then closed and prevents further flow of material through it.

As can be seen in FIGS. 4 and 6 the valve is capable of opening to a diameter substantially equal to the interior diameter of the conduit 20, so that substantially normal flow may take place when concrete is being deposited. This is made possible by virtue of the enlarged diameter of the pipe section 26 which allows room for the compressed elastic material 30 when the valve is fully opened.

It will be appreciated that the valve described herein responds strictly to the pressure of the fluid within the conduit 20 and that no other means are required to control the valve other than the pump which delivers the fluid through the conduit. This is made possible by the particular valve construction herein described wherein a flexible sleeve is arranged to be pinched closed by an elastic material 30 and wherein the outer construction, comprising the fittings 24 and the pipe section 26 serve to isolate the elastic material from all pressure effects other than those transmitted by the fluids through the sleeve itself.

Although particular embodiments of the invention are herein disclosed for purposes of explanation, various modifications thereof, after study of this specification, will be apparent to those skilled in the art to which the invention pertains.

What is claimed and desired to be secured by letters patent is:

1. A pressure responsive valve comprising a fluid conduit including along its length a flexible sleeve, a compressible elastic material surrounding said sleeve and holding its central region in a normally pinched closed condition, and a rigid outer casing surrounding said elastic material and isolating said elastic material from all pressure effects other than effects of fluid pressure applied through said sleeve from within said conduit, said rigid outer casing being permanently closed to prevent movement of said elastic material into or out from said casing.

2. A pressure responsive valve according to claim 1 wherein said elastic material is a solid foamed resilient material.

3. A pressure responsive valve accoding to claim 1 wherein said flexible sleeve is elastic.

4. A pressure responsive valve according to claim 3 wherein said flexible sleeve is, in its normal unstressed condition, in the configuration of an hourglass.

5. A pressure responsive valve according to claim 1 wherein the flexible sleeve is elastic and wherein in its normal unstressed condition, said sleeve is in the configuration of an hourglass with a normally open central region, said region being normally pinched closed by said elastic material.

6. A pressure responsive valve according to claim 1, wherein said rigid outer casing surrounding said elastic material isolating said elastic material from pressure effects comprises a pipe section surrounding said sleeve to which the ends of said sleeve are bonded and wherein said elastic material is positioned between the sleeve and the pipe section.

7. A fluid material depositing system comprising a variable delivery pumping means, a conduit extending from the outlet of said pumping means, a pressure responsive valve interposed in said conduit, said valve including a flexible sleeve forming a portion of the length of said conduit, an elastic material surrounding said sleeve and holding its central region in a normally pinched closed condition and to hold said central region closed up to a predetermined threshold pressure, and a rigid outer casing surrounding said elastic material and isolating said elastic material from all pressure effect other than effects of fluid pressure applied through said sleeve from within said conduit, said rigid outer casing being permanently closed to prevent movement of said elastic material into and out from said casing, said pumping means being operable to vary the fluid pressure in the conduit incident on said valve above and below said threshold pressure.

8. A fluid material depositing system according to claim 7, wherein said rigid outer casing surrounding said elastic material and isolating said elastic material from pressure effects comprises a pipe section surrounding said sleeve and bonded to the ends of the sleeve and wherein said elastic material is positioned between the sleeve and the pipe section.

9. A fluid material depositing system according to claim 8 wherein said pipe section is of larger diameter than said conduit.

10. A fluid material depositing system according to claim 9 wherein said flexible sleeve is elastic and stretchable to the diameter of said conduit.

* * * * *